United States Patent [19]

Loeffler et al.

[11] 4,380,452

[45] * Apr. 19, 1983

[54] DYEING AND PRINTING OF CELLULOSE-CONTAINING TEXTILE MATERIAL

[75] Inventors: Hermann Loeffler, Speyer; Werner Juenemann, Bad Durkheim; Gunther Lamm, Hassloch, all of Fed. Rep. of Germany

[73] Assignee: BASF Aktiengesellschaft, Ludwigshafen, Fed. Rep. of Germany

[*] Notice: The portion of the term of this patent subsequent to Dec. 15, 1998, has been disclaimed.

[21] Appl. No.: 288,209

[22] Filed: Jul. 29, 1981

Related U.S. Application Data

[63] Continuation of Ser. No. 164,005, Jun. 30, 1980, Pat. No. 4,305,718.

[30] Foreign Application Priority Data

Jul. 23, 1979 [DE] Fed. Rep. of Germany ....... 2929763

[51] Int. Cl.$^3$ .......................... C09B 29/36; D06P 3/60
[52] U.S. Cl. ........................................... 8/532; 8/662; 8/696; 8/918; 260/156
[58] Field of Search .................... 8/532, 696, 918, 662

[56] References Cited

U.S. PATENT DOCUMENTS 3,706,525  12/1972  Blackwell et al. ...................... 8/532
4,224,026  9/1980  Reinhardt .............................. 8/532
4,305,718  12/1981  Loffler et al. ........................... 8/532

FOREIGN PATENT DOCUMENTS 1559001  1/1980  United Kingdom .
1584212  2/1981  United Kingdom .

*Primary Examiner*—A. Lionel Clingman
*Attorney, Agent, or Firm*—Oblon, Fisher, Spivak, McClelland & Maier

[57] ABSTRACT

A process for dyeing and printing cellulose-containing textile material, wherein the dye used is a compound of the general formula I

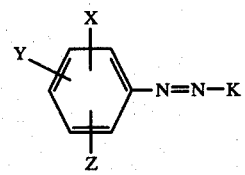

where
K is the radical of a coupling component of the pyridone, pyrazole or indole series,
one of the radicals X, Y and Z is a carboxylic acid ester group of a total of 2 to 19 carbon atoms, a carboxamide group of a total of 1 to 19 carbon atoms, an unsubstituted or substituted sulfonic acid phenyl ester group or a sulfonamide group of a total of 6 to 18 carbon atoms, and
the remaining substituents X, Y and Z are hydrogen, methyl, chlorine, bromine or nitro.

2 Claims, No Drawings

DYEING AND PRINTING OF CELLULOSE-CONTAINING TEXTILE MATERIAL

This is a continuation of application Ser. No. 164,005, filed June 30, 1980, now U.S. Pat. No. 4,305,718.

The present invention relates to a process for dyeing and printing cellulose-containing textile material, wherein the dye used is a compound of the general formula I

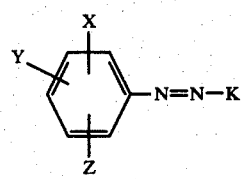

where
K is the radical of a coupling component of the pyridone, pyrazole or indole series,
one of the radicals X, Y and Z is a carboxylic acid ester group of a total of 2 to 19 carbon atoms, a carboxamide group of a total of 1 to 19 carbon atoms, an unsubstituted or substituted sulfonic acid phenyl ester group or a sulfonamide group of a total of 6 to 18 carbon atoms, and
the remaining substituents X, Y and Z are hydrogen, methyl, chlorine, bromine or nitro.

The coupling component of the general formula KH preferably has the formula

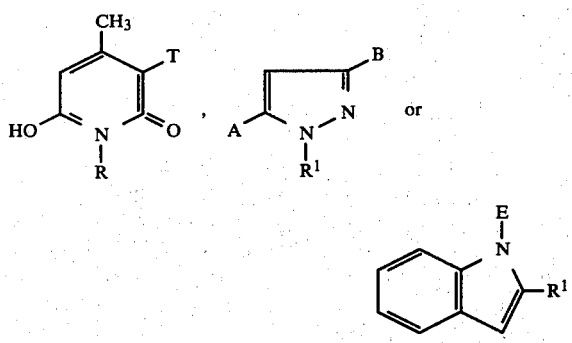

where
R is hydrogen, $C_1$–$C_{10}$-alkyl, allyl, $C_1$–$C_4$-alkyl which is substituted by $C_1$–$C_4$-alkoxy, by phenoxy, by phenoxyethoxy or by phenyl (which is itself unsubstituted or substituted), $C_6$–$C_{12}$-polyalkoxyalkyl, phenyl, cyclohexyl or norbornyl,
$R^1$ is phenyl which is unsubstituted or substituted by chlorine, by bromine, by $C_1$–$C_4$-alkyl or by $C_1$–$C_4$-alkoxy, or is methyl,
A is amino or hydroxyl,
B is methyl, a carboxylic acid ester group or unsubstituted or substituted carbamyl,
E is hydrogen, methyl, ethyl, $\beta$-cyanoethyl, $\beta$-carbamylethyl or allyl and
T is hydrogen, cyano, carbamyl or acetyl.

Examples of N-substituents of the carboxamide or sulfonamide groups of the diazo component are methyl, ethyl, propyl, butyl, n-hexyl, phenyl, benzyl, phenylethyl, 2-phenylpropyl, 2-ethylhexyl, 1,5-dimethylhexyl, n-octyl, n-dodecyl, n-tridecyl, 6-methylheptyl, 3-(2-ethyl-hexoxy)-propyl, stearyl, cyclohexyl, $\beta$-methoxyethyl, $\beta$-butoxyethyl, $\gamma$-methoxypropyl, $\gamma$-butoxypropyl or $\gamma$-ethoxypropyl; furthermore, the N-substituted carboxamide or sulfonamide can be the pyrrolidide, piperidide or morpholide.

Examples of O-substituents of sulfonic acid ester groups are phenyl, o-, m- and p-tolyl, o-, m- and p-chlorophenyl and 2,5-dichlorophenyl.

Examples of suitable carboxylic acid ester groups are:

$COOCH_3$, $COOC_2H_5$, $COOC_3H_7$, $COOC_4H_9$—(n), $COO-CH_2-CH(CH_3)_2$, $COOC(CH_3)_3$, $COOC_4H_8Cl$, $COOC_5H_{11}(n)$, $COOCH_2C(CH_3)_3$, $COOC_6H_{13}$, $COO-\langle H \rangle$, $COOCH\begin{smallmatrix}C_2H_5\\CH_2-CH=CH_2\end{smallmatrix}$, $COOC_2H_4CH\begin{smallmatrix}OCH_3\\CH_3\end{smallmatrix}$, $COOC_7H_{15}$, $COOC_8H_{17}$, $COOCH_2CH\begin{smallmatrix}C_2H_5\\C_4H_9\end{smallmatrix}$, $COOC_9H_{19}$, $COOC_{10}H_{21}$, $COOC_{12}H_{25}$, $COOC_{16}H_{33}$, $COOC_{18}H_{37}$, $COOC_2H_4OC_2H_5$, $COOC_2H_4OC_4H_9$, $COOC_2H_4OC_6H_5$, $COOCH_2C_6H_5$, $COOC_2H_4C_6H_5$, $COOC_2H\begin{smallmatrix}CH_3\\C_6H_5\end{smallmatrix}$, $COOC_2H_4OC_6H_5$, $COO(C_2H_4O)_2CH_3$, $COO(C_2H_4O)_2C_2H_5$, $COO(C_2H_4O)_2C_4H_9$, $COO(C_2H_4O)_3C_2H_5$ and $COO(C_2H_4O)_3C_4H_9$.

The carbamyl and carboxylic acid ester groups listed as possible substituents of the diazo component are also possible meanings of the radical B in the coupling component.

Specific examples of radicals R, in addition to those already mentioned, are:

$CH_3$, $C_2H_5$, $C_2H_4CN$, $C_3H_7$, $C_4H_9$, $CH_2CH(CH_3)_2$, $C_6H_{13}$, $\begin{smallmatrix}C_2H_5\\C_2H_5\end{smallmatrix}CHCH_2$, $C_6H_5$, $C_6H_4CH_3$, $C_6H_4OCH_3$, $CH_2-CH\begin{smallmatrix}C_2H_5\\C_4H_9\end{smallmatrix}$ $C_{10}H_{21}$, $CH_2-\langle \rangle$, $C_2H_4-\langle \rangle$, $C_2H_4O-\langle \rangle$, $C_3H_6O-\langle \rangle$, $C_2H_4OCH_3$, $C_2H_4OC_4H_9$, $C_3H_6OCH_3$, $C_3H_6OC_2H_5$, $C_3H_6OC_3H_7$, $C_3H_6OC_4H_9$, $C_3H_6OC_2H_4OC_6H_5$, $C_3H_6OCH_2CH\begin{smallmatrix}C_2H_5\\C_4H_9\end{smallmatrix}$, $C_3H_6OCH_2C_6H_5$ and

C₃H₆OC₂H₄C₆H₅.

The dyes of the general formula I, to be used according to the invention, are obtained if an amine of the general formula III

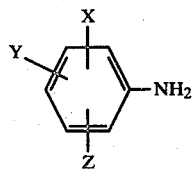

which is free from ionic groups is diazotized and coupled in a conventional manner with a component KH of the general formula II, X, Y, Z, R, R¹, A, B, E and T having the stated meanings.

Examples of suitable amines of the formula II are: the methyl, ethyl, n-butyl, i-butyl, n-hexyl, cyclohexyl, β-ethylhexyl, n-decyl, i-decyl, octadecyl, phenyl, 4'-tert.-butylphenyl, benzyl, phenylethyl, phenoxyethyl, β-ethoxy-ethyl, β-butoxy-ethyl, β-(β'-butoxy-ethoxy)-ethyl and γ-(γ'-methoxy-propoxy)-propyl esters of 2-aminobenzoic acid and of 4-aminobenzoic acid, and of the monohalo, dihalo, nitro and nitrohalo derivatives of these acids, eg. decyl 2-amino-3,5-dibromobenzoate, β-phenoxy-ethyl 2-amino-5-chloro-benzoate, decyl 2-amino-5-nitro-benzoate and decyl 2-amino-3-bromo-5-nitro-benzoate, as well as 2- and 4-aminobenzoic acid dimethylamide, diethylamide, iso-propylamide, di-n-butylamide, piperidide, morpholide, n-hexylamide, cyclohexylamide, ethylhexylamide, n- and i-decylamide, anilide, N-methylanilide, β-phenylethylamide and γ-(β'-phenoxy-ethoxy)-propylamide, as well as the corresponding amides of the monohalo, dihalo, nitro and nitrohalo derivatives of the acids, eg. 2-amino-3,5-dibromobenzoic acid β-ethylhexylamide, 2-amino-5-nitro-benzoic acid cyclohexylamide and 2-amino-3-bromo-5-nitro-benzoic acid β-ethylhexylamide.

Further suitable amides are 4-aminobenzenesulfonic acid 2-ethylhexyl-amide, tridecylamide, piperidide, β-phenylethyl-amide, 2-phenylpropyl-amide, n- and i-octylamide, 6-methylhept-2-ylamide, n-hexylamide, γ-(β-phenoxyethoxy)-propylamide, n-dodecylamide, diisooctylamide, 2-ethylhexoxy-propylamide, octadecylamide, anilide, toluidide, N-methylanilide, N-ethylanilide, N-ethylcyclohexylamide, N-methylcyclohexylamide, cyclohexylamide, β-cyclohexylethylamide, benzylamide, di-n-butylamide and dibenzylamide, and the corresponding compounds derived from 4-amino-3-chloro-, -3-bromo-, -3,5-dichloro- and -3,5-dibromo-benzenesulfonic acid; 4-aminobenzoic acid tridecylamide, 2-phenylpropyl-amide, n- and i-octylamide, n-dodecylamide, diisooctylamide, 2-ethylhexoxy-propylamide, octadecylamide, N-ethylcyclohexylamide, N-methylcyclohexylamide, β-cyclohexylethyl-amide and benzylamide, and the corresponding amides of 4-amino-3-chloro-, -3-bromo-, -3,5-dichloro- and -3,5-dibromo-benzoic acid; phenyl, tolyl, chlorophenyl and 2,5-dichlorophenyl 2-aminobenzenesulfonate; 2-aminobenzenesulfonic acid N-methylanilide, N-ethylanilide, N-methylcyclohexylamide, N-ethylcyclohexylamide, di-n-butylamide, dibenzylamide and di-(2-ethylhexyl)-amide, and the corresponding esters and amides of the monohalo, dihalo, nitro and nitrohalo derivatives of 2-aminobenzenesulfonic acid, eg. 2-amino-5-nitro-benzenesulfonic acid N-ethylanilide, phenyl 2-amino-3,5-dibromobenzenesulfonate, phenyl 2-amino-5-nitrobenzenesulfonate, phenyl 2-amino-3-bromo-5-nitro-benzenesulfonate and 2-amino-3,5-dibromobenzenesulfonic acid N-methylanilide; phenyl 4-aminobenzenesulfonate, phenyl 4-amino-3,5-dibromobenzenesulfonate and tolyl 4-aminobenzenesulfonate; 4-amino-2,5-dichlorobenzenesulfonic acid 2-ethylhexoxy-propylamide, 2-phenylethylamide, 2-phenoxy-ethoxy-propylamide, n-octylamide and 2-ethylhexyl-amide.

Preferred dyes for use in the process according to the invention are those of the formula

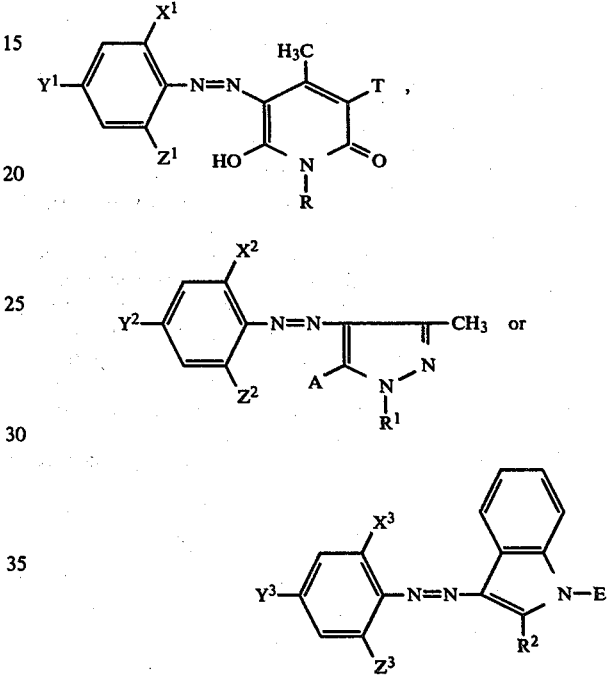

where A, E, R, R¹ and T have the stated meanings and R² is methyl or phenyl, and where one of X¹ and Y¹, one of X² and Y², and one of X³ and Y³ is a carboxylic acid ester group or carboxamide group of a total of 2 to 13 carbon atoms, or a sulfonamide group or unsubstituted or substituted sulfonic acid phenyl ester group of a total of 6 to 18 carbon atoms, and of the remaining substituents, either X¹ or Y¹, and Z¹, are hydrogen, either X² or Y², and Z², are hydrogen, chlorine or bromine and either X³ or Y³, and Z³, are hydrogen, chlorine, bromine or nitro.

Suitable processes for applying the dyes of the formula I are, in particular, those described in German Pat. No. 1,811,796, German Laid-Open Applications DOS Nos. 2,524,243 and DOS No. 2,528,743 and German Patent Application P No. 2,855,188.4. Details of the methods of application may be found in the Examples, where parts and percentages are by weight, unless stated otherwise.

EXAMPLE 1

A fabric comprising 65 parts of polyester fibers and 35 parts of mercerized cotton is impregnated with a liquor which contains 80 g/l of a 20% strength aqueous formulation of a water-insoluble yellow disperse dye of the formula

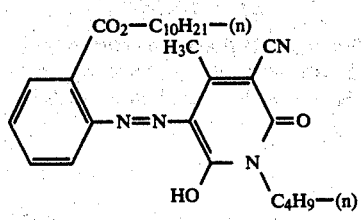

and 80 g/l of a swelling agent and dye solvent which in turn consists of 80 parts of a polyethylene glycol of molecular weight 1500 and 20 parts of a reaction product of 1 mole of hexamethylenediamine with 15 moles of ethylene oxide. The pH of the liquor is brought to 6 with citric acid.

The impregnated fabric is dried for 60 seconds at 120° C. and is then heated for 60 seconds at 215° C. to fix the dye. The fabric is then rinsed cold and warm and is soaped for 20 minutes at 100° C. in the presence of a commercial detergent.

A greenish yellow dyeing having good lightfastness, washfastness and fastness to crocking is obtained.

EXAMPLE 2

A polyester/cotton union fabric is printed with a formulation which comprises 10 parts of the dye from Example 1, 100 parts of a reaction product of polyethylene oxide, of molecular weight 300, with boric acid in the molar ratio of 3:1, 30 parts of oleic acid diethanolamide and 860 parts of a 3% strength alginate thickener. The print is dried at 110° C. and is then treated for 5 minutes with live steam at 185° C., after which the fabric is rinsed cold and soaped at 100° C., using a commercial detergent. A lightfast, washfast and solvent-fast greenish yellow print on a white ground is obtained.

EXAMPLE 3

A 65:35 polyester/cotton union fabric is printed with a paste which comprises 20 parts of the dye

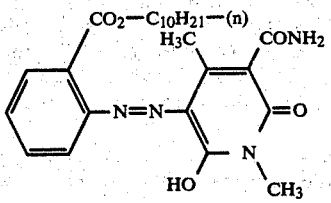

110 parts of polyethylene oxide of molecular weight 350, 30 parts of oleic acid diethanolamide and 840 parts of a 10% strength alginate thickener. The printed material is dried at 100° C. and the print is then fixed for 60 seconds with hot air at 190°–215° C. Thereafter, the print is rinsed cold and warm and soaped at 100° C., using a commercial detergent. A very greenish yellow print, with good fastness characteristics, is obtained on a white ground.

EXAMPLE 4

A fabric of 67 parts of polyester fibers and 33 parts of mercerized cotton is impregnated with a liquor which contains 100 g/l of a mixture of 80 parts of an ester of boric acid with polyethylene glycol (molecular weight about 800) in the molar ratio of 1:3 and 20 parts of the adduct of ethylenediamine and 35 moles of ethylene oxide. The wet pick-up is 80%. The fabric is then dried for 15 minutes at 60°–70° C.

The following print paste is printed onto the substrate:

500 parts of a 10% strength aqueous starch ether thickener
2 parts of citric acid
10 parts of sodium m-nitrobenzenesulfonate
50 parts of the dye

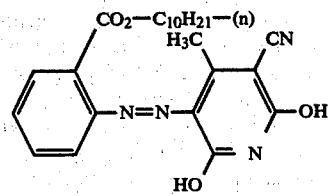

and
438 parts of water.

The print is dried for 2 minutes at 130° C. and treated with hot air at 210° C. for 90 seconds. After rinsing, a greenish yellow print on a white ground is obtained.

EXAMPLE 5

A fabric of 65 parts of polyester fibers and 35 parts of mercerized cotton is impregnated with a dye liquor which contains 20 g/l of a 20% strength formulation of the dye of the formula

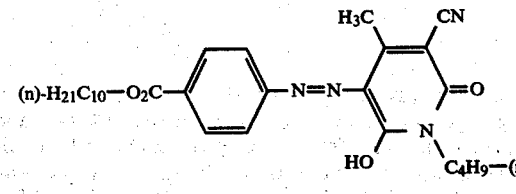

and, as a swelling agent and dye solvent, 60 g/l of a mixture of 1 part of a reaction product of 1 mole of i-octylphenol with 14 moles of ethylene oxide and 2 parts of a reaction product of 1 mole of piperazine with 16 moles of ethylene oxide. The pH of the liquor is brought to 6 with glutaric acid. The fabric is dried for 60 seconds at 120° C. and the dye is then fixed for 30 seconds at 225° C. The fabric is then rinsed cold and warm and washed at 100° C. in the presence of a commercial detergent. A brilliant yellow dyeing having good washfastness and lightfastness is obtained.

EXAMPLE 6

A mercerized cotton twill is impregnated with an aqueous dye liquor which contains 80 g/l of the dye of the formula

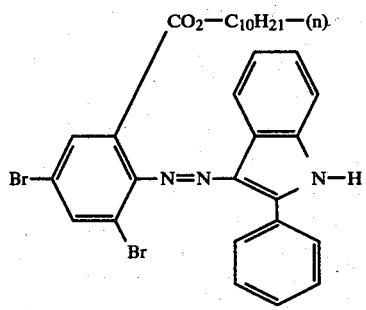

and 200 g of a mixture of 80 parts of a polyethylene glycol of molecular weight 800 and 20 parts of a block polymer of 1 mole of ethylenediamine, 6 moles of propylene oxide and 8 moles of ethylene oxide. The pH of the liquor is brought to 6 with citric acid. The wet pick-up is 52%.

The fabric is then dried in a conventional manner at 120° C. and the print is fixed for 30 seconds at 215° C. in a laboratory dryer. After rinsing and washing, an orange dyeing having good fastness characteristics is obtained.

EXAMPLE 7

A cotton fabric is printed, by rotary screen printing, with a formulation which consists of 15 parts of the dye of the formula

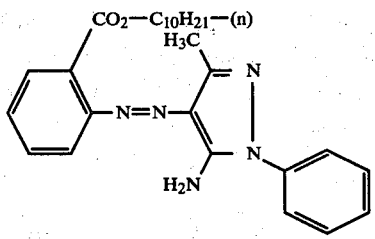

100 parts of polyethylene oxide of molecular weight 300 and 885 parts of a 3% strength alginate thickener, and the print is dried at 100° C. It is then treated with hot air at 200° C. for 1 minute, rinsed cold, soaped at the boil, again rinsed cold, and dried. A lightfast and washfast yellow print on a white ground is obtained.

EXAMPLE 8

A 50:50 (by weight) polyester/cotton union fabric is impregnated with an aqueous liquor which contains 20 g/l of a 20% strength formulation of the dye of the formula

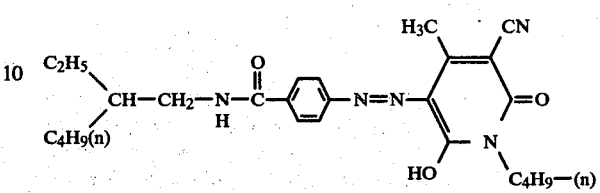

and, as a swelling agent and dye solvent, 50 g/l of a mixture of 80 parts of a polyethylene glycol of molecular weight 600 and 20 parts of a reaction product of 1 mole of triethanolamine with 14 moles of ethylene oxide. The pH of the liquor is brought to 7 with glutaric acid. The fabric is dried for 60 seconds at 120° C. and then heated for 90 seconds at 210° C. It is then rinsed cold and warm and washed for 5 minutes at 100° C. in the presence of a commercial detergent. A lightfast and washfast golden yellow dyeing is obtained.

EXAMPLE 9

A 65:35 (by weight) polyester/cotton union fabric is printed with a paste which consists of 20 parts of the dye of the formula

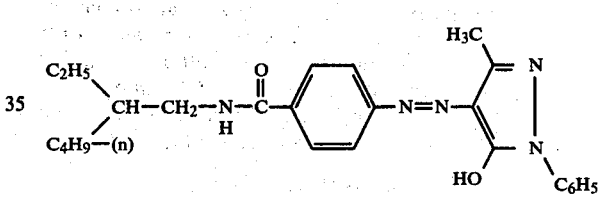

120 parts of a reaction product of polyethylene oxide, of molecular weight 300, with boric acid in the molar ratio of 3:1 and 860 parts of a 10% strength alginate thickener. The print is dried at 105° C. and treated with live steam at 180° C. for 6 minutes. It is then rinsed with cold water, soaped at 80° C., rinsed cold and dried. A lightfast and washfast golden yellow print on a white ground is obtained.

Similarly, the dyes identified in the Table in terms of their substituents give prints which have the hue shown and which as a rule possess good fastness characteristics.

| Example | D | T | R | Hue on polyester/cotton |
|---|---|---|---|---|
| 10 | 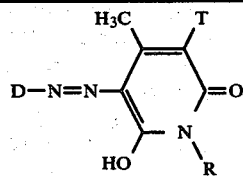 $CO_2C_{10}H_{21}$—(n) | CN | $C_3H_7$ | greenish yellow |
| 11 | " | " | $C_2H_4OCH_3$ | " |

-continued
| Example | D | T | R | Hue on polyester/cotton |
|---|---|---|---|---|
| 12 | " | " | $C_6H_{13}-n$ | " |
| 13 | " | " | $CH_2CH(C_2H_5)-C_4H_9$ | " |
| 14 | " | $CONH_2$ | $CH_3$ | " |
| 15 | " | " | $C_4H_9-(n)$ | " |
| 16 | " | " | $CH_2-CH(C_2H_5)-C_4H_9$ | " |
| 17 | " | " | H | " |
| 18 |  | CN | $C_4H_9-(n)$ | " |
| 19 | " | " | $CH_3$ | " |
| 20 | " | " | $C_2H_4OCH_3$ | " |
| 21 |  | " | $C_4H_9-(n)$ | " |
| 22 | " | " | $C_6H_{13}-(n)$ | " |
| 23 |  | CN | $C_4H_9-(n)$ | " |
| 24 | " | " | $C_6H_{13}-(n)$ | " |
| 25 | " | $CHNH_2$ | $CH_3$ | " |
| 26 | " | $COCH_3$ | " | " |
| 27 | 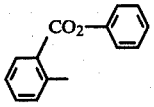 | CN | H | " |
| 28 | " | " | $CH_3$ | " |
| 29 | " | $CONH_2$ | H | " |
| 30 | " | CN | $C_4H_9-(n)$ | " |
| 31 | " | $CONH_2$ | " | " |
| 32 | " | $COCH_3$ | " | " |
| 33 |  | CN | " | " |
| 34 | " | " | $C_6H_{13}-(n)$ | " |
| 35 | " | " | $CH_2-CH(C_2H_5)-C_4H_9$ | " |
| 36 | " | " | $C_6H_5$ | " |
| 37 | " | $COCH_3$ | $CH_3$ | " |

-continued $$\underset{HO}{\overset{H_3C}{\underset{D-N=N}{\bigwedge}}}\overset{T}{\underset{N}{\bigvee}}=O$$
$$\phantom{xxxxxxxxxxxx}R$$

| Example | D | T | R | Hue on polyester/cotton |
|---|---|---|---|---|
| 38 | 3,5-Cl$_2$-2-CH$_3$-C$_6$H$_2$-CO$_2$-CH$_2$-CH(C$_2$H$_5$)C$_4$H$_9$ | CN | H | " |
| 39 | " | " | CH$_3$ | " |
| 40 | " | CONH$_2$ | C$_4$H$_9$—(n) | " |
| 41 | 2-CH$_3$-C$_6$H$_4$-CO$_2$-C$_2$H$_4$-C$_6$H$_5$ | CN | CH$_3$ | " |
| 42 | " | " | C$_4$H$_9$—(n) | " |
| 43 | " | " | C$_6$H$_{13}$—(n) | " |
| 44 | " | " | C$_2$H$_4$OCH$_3$ | " |
| 45 | (n)-H$_{21}$C$_{10}$—O$_2$C—C$_6$H$_4$— | " | H | yellow |
| 46 | " | " | CH$_3$ | " |
| 47 | " | CONH$_2$ | C$_4$H$_9$—(n) | " |
| 48 | " | COCH$_3$ | " | " |
| 49 | (n)-H$_{21}$C$_{10}$—O$_2$C—(3,5-Br$_2$-4-CH$_3$-C$_6$H$_2$)— | CONH$_2$ | " | " |
| 50 | " | COCH$_3$ | CH$_3$ | " |
| 51 | 3-(CO$_2$C$_{10}$H$_{21}$—(n))-C$_6$H$_4$— | CN | C$_4$H$_9$—(n) | greenish yellow |
| 52 | 3-(CO$_2$C$_{10}$H$_{21}$—(i))-C$_6$H$_4$— | CN | C$_4$H$_9$—(n) | " |
| 53 | 2-(CO$_2$—C$_2$H$_4$—O—C$_6$H$_5$)-C$_6$H$_4$— | CN | C$_4$H$_9$—(n) | " |
| 54 | " | " | CH$_2$—CH(C$_2$H$_5$)—C$_4$H$_9$ | " |
| 55 | " | " | C$_2$H$_4$—C$_6$H$_5$ | " |
| 56 | " | " | C$_6$H$_{13}$—(n) | " |

-continued

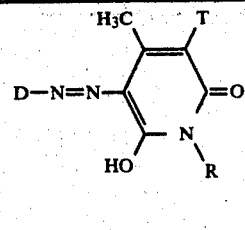

| Example | D | T | R | Hue on polyester/cotton |
|---|---|---|---|---|
| 57 | 2-CO₂C₂H₅-C₆H₄- | " | CH₂—CH(C₂H₅)—C₄H₉ | " |
| 58 | " | " | C₆H₁₃—(n) | " |
| 59 | 4-(H₉C₄—CH(C₂H₅)—CH₂—OC₂)-C₆H₄- | " | CH₃ | yellow |
| 60 | " | " | C₄H₉—(n) | " |
| 61 | " | " | C₆H₁₃—(n) | " |
| 62 | " | " | CH₂—CH(C₂H₅)—C₄H₉ | " |
| 63 | " | CONH₂ | C₄H₉—(n) | " |
| 64 | 3,5-Br₂-4-CH₃-(H₉C₄—CH(C₂H₅)—CH₂—O₂C)-C₆H₂- | CN | C₄H₉—(n) | " |
| 65 | " | CONH₂ | " | " |
| 66 | " | CN | CH₃ | " |
| 67 | " | CONH₂ | " | " |
| 68 | 2-CH₃-(C₁₀H₂₁O—CO)-C₆H₄- | CN | CH₂CH=CH₂ | " |
| 69 | 4-(n-C₄H₉)(C₂H₅)CH—CH₂—NHSO₂-C₆H₄- | " | " | " |
| 70 | " | " | C₂H₄C₆H₅ | " |
| 71 | 4-(n-Octyl-NHSO₂)-C₆H₄- | " | C₄H₉—(n) | " |
| 72 | 4-(i-Octyl-NHSO₂)-C₆H₄- | " | " | " |
| 73 | " | H | " | greenish yellow |
| 74 | 4-(n-C₁₃H₂₇—NH—CO)-C₆H₄- | CN | " | yellow |
| 75 | " | CONH₂ | " | " |
| 76 | " | CN | CH₃ | " |
| 77 | 4-(C₆H₅—C₂H₄—NHSO₂)-C₆H₄- | " | C₄H₉—(n) | " |

-continued

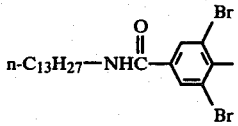

| Example | D | T | R | Hue on polyester/cotton |
|---|---|---|---|---|
| 78 | 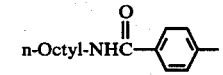 n-C₁₃H₂₇—NHC(O)— (3,5-Br₂-4-CH₃-phenyl) | CONH₂ | CH₃ | " |
| 79 | " | CN | " | " |
| 80 | 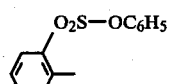 n-Octyl-NHC(O)— | " | C₄H₉—(n) | " |
| 81 | 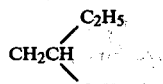 O₂S—OC₆H₅ (o-tolyl) | " | CH₂CH(C₂H₅)(C₄H₉) | " |
| 82 | " | " | C₂H₄C₆H₅ | " |
| 83 | 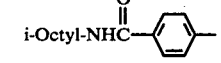 i-Octyl-NHC(O)— | " | C₄H₉—(n) | " |
| 84 | " | H | " | greenish yellow |
| 85 | 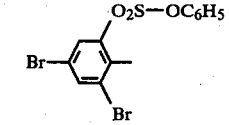 O₂S—OC₆H₅ (3,5-Br₂-2-methyl) | CN | CH₂CH(C₂H₅)(C₄H₉—(n)) | yellow |
| 86 | " | " | C₆H₁₃—(n) | " |
| 87 | 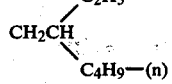 O₂S—N(CH₃)—C₆H₅ (o-tolyl) | " | CH₂CH(C₂H₅)(C₄H₉—(n)) | " |
| 88 | 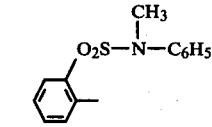 C₆H₅—C₂H₄—NHC(O)— | " | C₄H₉—(n) | " |
| 89 | " | H | " | greenish yellow |
| 90 | 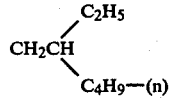 n-C₁₃H₂₇—NHSO₂— | CN | CH₃ | yellow |
| 91 | " | CONH₂ | " | " |
| 92 | " | COCH₃ | " | " |
| 93 | " | CN | C₂H₅ | " |
| 94 | " | H | C₄H₉ | greenish yellow |
| 95 | 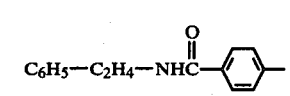 (CH₃)₂CH—C₃H₆CH(CH₃)—N(H)C(O)— | CN | CH₃ | yellow |
| 96 | " | " | C₄H₉—(n) | " |

-continued

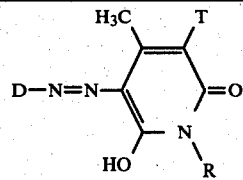

| Example | D | T | R | Hue on polyester/cotton |
|---|---|---|---|---|
| 97 | n-$C_{13}H_{27}$—$NHSO_2$—(3,5-Br, 4-CH₃-phenyl) | " | $CH_3$ | " |

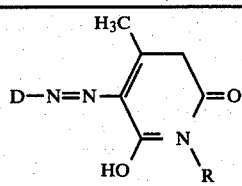

| Example | D | R | Hue on polyester/cotton |
|---|---|---|---|
| 98 | (n)—$H_{21}C_{10}O_2C$—C₆H₄— | $C_4H_9$—(n) | greenish yellow |
| 99 | (n)—$H_{21}C_{10}O_2C$—C₆H₄— | $CH_3$ | greenish yellow |
| 100 | (n)—$H_{21}C_{10}O_2C$—C₆H₄— | —C₆H₅ | greenish yellow |
| 101 | (n)—$H_{21}C_{10}O_2C$—C₆H₄— | $C_6H_{13}$—(n) | greenish yellow |
| 102 | 2-$CO_2C_{10}H_{21}$—(n)-phenyl | $C_4H_9$—(n) | greenish yellow |
| 103 | 2-$CO_2C_{10}H_{21}$—(n)-phenyl | $CH_3$ | greenish yellow |

-continued

| Example | D | R | Hue on polyester/cotton |
|---|---|---|---|
| 104 | 2-$CO_2C_{10}H_{21}$—(n)-phenyl | $C_3H_6$—$OCH_3$ | greenish yellow |
| 105 | 2-$CO_2(C_2H_4O)_2C_4H_9$-phenyl | $C_6H_{13}$—(n) | greenish yellow |
| 106 | 2-$CO_2(C_2H_4O)_2C_4H_9$-phenyl | —C₆H₅ | greenish yellow |
| 107 | 2-$CO_2C_{18}H_{37}$-phenyl | $C_3H_6OCH_3$ | greenish yellow |

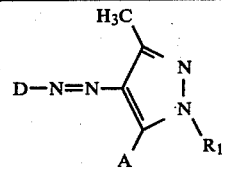

| Example | D | A | $R_1$ | Hue on polyester/cotton |
|---|---|---|---|---|
| 108 | 2-$CO_2C_{10}H_{21}$—(n)-phenyl | $NH_2$ | $C_2H_5$ | yellow |

-continued
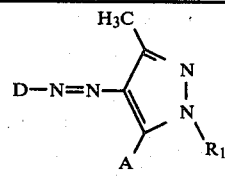
| Example | D | A | R₁ | Hue on polyester/cotton |
|---|---|---|---|---|
| 109 | " | " | —⟨⟩—OCH₃ | " |
| 110 | " | " | Br-⟨⟩- (ortho) | " |
| 111 | " | " | —⟨⟩—Br | " |
| 112 | Br-⟨⟩-CO₂C₁₀H₂₁—(n), 2-Me, 3-Br | OH | Cl-⟨⟩- | " |
| Example | D | A | R₁ | Hue on polyester/cotton |
|---|---|---|---|---|
| 113 | Br-⟨⟩-CO₂C₁₀H₂₁—(n), 2-Me, 3-Br | OH | —⟨⟩ | yellow |
| 114 | " | " | C₂H₅-⟨⟩- | " |
| 115 | " | " | —⟨⟩—OCH₃ | " |
| 116 | ⟨⟩-CO₂C₁₈H₃₇—(n), 2-Me | " | Cl-⟨⟩- | " |
| 117 | " | H₂N | —⟨⟩ | " |
| 118 | H₂₁C₁₀—O₂C-⟨⟩- | NH₂ | C₂H₅-⟨⟩- | " |
| 119 | " | " | Br-⟨⟩- | " |
| 120 | " | OH | Cl-⟨⟩- | " |
| 121 | " | " | —⟨⟩ | " |

-continued

| Example | D | A | R₁ | Hue on polyester/cotton |
|---|---|---|---|---|
| 122 | " | " |  2-Br-phenyl | " |
| 123 | 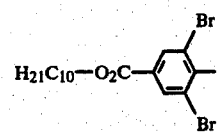 H₂₁C₁₀—O₂C— (3,5-dibromo-4-methyl)phenyl | " |  phenyl | " |
| 124 | " | " |  2-ethylphenyl | " |
| 125 | " | " |  2-Cl-phenyl | " |
| 126 | 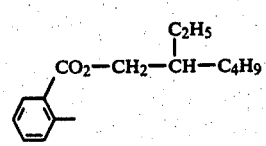 2-methylphenyl—CO₂—CH₂—CH(C₂H₅)—C₄H₉ | H₂N |  phenyl | " |
| 127 | 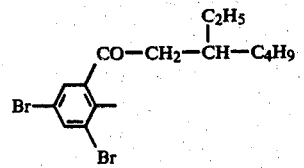 (3,5-dibromo-2-methyl)phenyl—CO—O—CH₂—CH(C₂H₅)—C₄H₉ | OH |  phenyl | " |
| 128 | 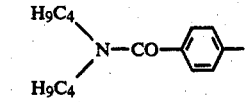 (C₄H₉)₂N—CO—(4-methyl)phenyl | H₂N |  phenyl | " |
| 129 | 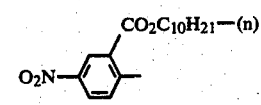 2-methyl-5-nitro-(CO₂C₁₀H₂₁(n))phenyl | OH |  phenyl | golden yellow |
| 130 | " | " | 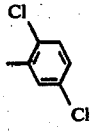 2,4-dichlorophenyl | yellow |
| 131 | 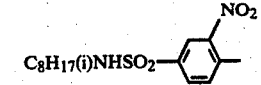 C₈H₁₇(i)NHSO₂—(3-nitro-4-methyl)phenyl | " |  3-Cl-phenyl | " |
| 132 | " | " |  phenyl | " |
| 133 | 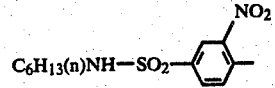 C₆H₁₃(n)NH—SO₂—(3-nitro-4-methyl)phenyl | " | " | " |
| 134 | 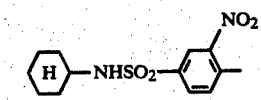 cyclohexyl—NHSO₂—(3-nitro-4-methyl)phenyl | " | " | " |

-continued

| Example | D | A | $R_1$ | Hue on polyester/cotton |
|---|---|---|---|---|
| 135 | 3-NO$_2$-4-(C$_8$H$_{17}$(n)SO$_2$)-C$_6$H$_3$— | " | " | " |
| 136 | 2-CH$_3$-C$_6$H$_4$-O-SO$_2$-(2-CH$_3$-C$_6$H$_3$)— | NH$_2$ | 2-C$_2$H$_5$-C$_6$H$_4$— | " |
| 137 | [CH$_2$(C$_2$H$_5$)(C$_4$H$_9$-n)CH—]—CHOC$_3$H$_6$—NHSO$_2$—(2,5-Cl$_2$-C$_6$H$_2$)— | " | C$_6$H$_5$ | " |
| 138 | n-C$_{13}$H$_{27}$NHSO$_2$—C$_6$H$_4$— | OH | " | " |
| 139 | C$_6$H$_5$—C$_2$H$_4$—NHSO$_2$—(2,5-Cl$_2$-C$_6$H$_2$)— | NH$_2$ | " | golden yellow |
| 140 | n-C$_{13}$H$_{27}$—NHC(O)—C$_6$H$_4$— | OH | " | yellow |
| 141 | C$_6$H$_5$OC$_2$H$_4$OC$_3$H$_6$N(H)SO$_2$—(2,5-Cl$_2$-C$_6$H$_2$)— | NH$_2$ | " | golden yellow |
| 142 | n-C$_{13}$H$_{27}$—NHC(O)—(3,5-Br$_2$-C$_6$H$_2$)— | OH | C$_6$H$_5$ | yellow |
| 143 | n-Octyl—NH—SO$_2$—(2,5-Cl$_2$-C$_6$H$_2$)— | NH$_2$ | " | " |
| 144 | [(C$_2$H$_5$)(C$_4$H$_9$-n)CH]—CH$_2$NHC(O)—C$_6$H$_4$— | " | " | " |
| 145 | " | " | 3-C$_2$H$_5$-C$_6$H$_4$— | " |
| 146 | " | OH | " | " |
| 147 | " | " | 2,4-Cl$_2$-C$_6$H$_3$— | " |
| 148 | C$_6$H$_5$—C$_2$H$_4$—NHC(O)—C$_6$H$_4$— | " | C$_6$H$_5$ | " |

-continued

| Example | D | A | R₁ | Hue on polyester/cotton |
|---|---|---|---|---|
| 149 | i-Octyl—NH—C(=O)—C₆H₄— | " | " | " |
| 150 | " | " | 2-C₂H₅-C₆H₄— | " |
| 151 | n-Octyl—NH—C(=O)—C₆H₄— | " | " | " |
| 152 | " | " | C₆H₅ | " |
| 153 | n-Octyl—NH—SO₂—C₆H₅ | " | " | " |
| 154 | i-Octyl—NH—SO₂—C₆H₄— | " | " | " |

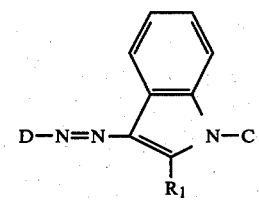

| Example | D | C | R₁ | Hue on polyester/cotton |
|---|---|---|---|---|
| 155 | (n)-H₂₁C₁₀—CO₂—C₆H₄— | H | C₆H₅ | brownish yellow |
| 156 | (n)-H₂₁C₁₀—CO₂—C₆H₄— | CH₃ | C₆H₅ | golden yellow |
| 157 | 3,5-Br₂-2-CH₃-C₆H₂—CO₂CH₂—CH(C₂H₅)—C₄H₉-(n) | H | C₆H₅ | orange |
| 158 | 2-CH₃-C₆H₄—CO₂C₁₈H₃₇ | CH₃ | C₆H₅ | golden yellow |
| 159 | 5-O₂N-2-CH₃-C₆H₃—CO₂C₁₀H₂₁-(n) | H | C₆H₅ | yellowish brown |
| 160 | 5-O₂N-2-CH₃-C₆H₃—CO₂C₁₀H₂₁-(n) | CH₃ | C₆H₅ | yellowish brown |

-continued

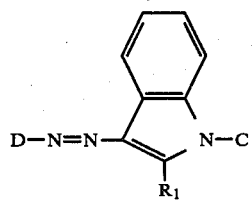

| Example | D | C | $R_1$ | Hue on polyester/cotton |
|---|---|---|---|---|
| 161 | 3-Br, 5-$O_2N$, 2-CH₃, 1-$CO_2C_{10}H_{21}$—(n) phenyl | H | phenyl | yellowish brown |
| 162 | 3-Br, 5-$O_2N$, 2-CH₃, 1-$CO_2C_{10}H_{21}$—(n) phenyl | $CH_3$ | phenyl | yellowish brown |
| 163 | 5-$O_2N$, 2-CH₃, 1-$CO_2$—$C_2H_4$—O—phenyl | H | phenyl | yellowish brown |
| 164 | 5-$O_2N$, 2-CH₃, 1-$CO_2$—$C_2H_4$—O—phenyl | $CH_3$ | phenyl | yellowish brown |
| 165 | 3-Br, 5-$O_2N$, 2-CH₃, 1-$CO_2$—$C_2H_4$—$OCH_3$ phenyl | H | phenyl | yellowish brown |
| 166 | 3-Br, 5-$O_2N$, 2-CH₃, 1-$CO_2$—$C_2H_4$—$OCH_3$ phenyl | $CH_3$ | phenyl | yellowish brown |
| 167 | 5-$O_2N$, 2-CH₃, 1-$CO_2$—$C_2H_4$—$OCH_3$ phenyl | $CH_3$ | phenyl | yellowish brown |
| 168 | 5-$O_2N$, 2-CH₃, 1-$CO_2$—$C_2H_4$—$OCH_3$ phenyl | $C_2H_4CN$ | phenyl | yellowish brown |
| 169 | 5-$O_2N$, 2-CH₃, 1-$CO_2$—$C_{10}H_{21}$—(n) phenyl | $C_2H_4CN$ | phenyl | yellowish brown |
| 170 | 3-Br, 5-$O_2N$, 2-CH₃, 1-$CO_2$—$C_{10}H_{21}$—(n) phenyl | $C_2H_4CONH_2$ | phenyl | yellowish brown |

-continued

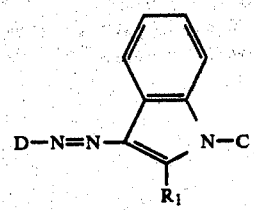

| Example | D | C | $R_1$ | Hue on polyester/cotton |
|---|---|---|---|---|
| 171 | 3-$O_2N$, 2-methyl-phenyl with $CO_2-C_{10}H_{21}-(i)$ | H | $C_6H_5$ | yellowish brown |
| 172 | 3-$O_2N$, 2-methyl-phenyl with $CO_2-C_{10}H_{21}-(i)$ | $CH_3$ | $C_6H_5$ | yellowish brown |
| 173 | 2-methylphenyl with $O_2SOC_6H_5$ | $CH_3$ | $C_6H_5$ | golden yellow |
| 174 | 3,5-dibromo-2-methylphenyl with $O_2SOC_6H_5$ | $CH_3$ | $C_6H_5$ | golden yellow |
| 175 | 3,5-dibromo-4-methylphenyl with n-$C_{13}H_{27}$—NHCO— | $CH_3$ | $C_6H_5$ | golden yellow |
| 176 | 4-methylphenyl with n-$C_{13}H_{27}$—NHCO— | $CH_3$ | $C_6H_5$ | golden yellow |

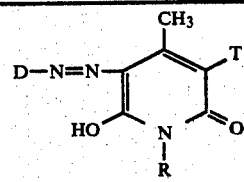

| Example | D | T | R | |
|---|---|---|---|---|
| 177 | 2-methylphenyl with $CO_2C_{10}H_{21}-(n)$ | CN | $C_{10}H_{21}-(n)$ | greenish yellow |
| 178 | " | " | $C_{12}H_{25}$ | " |
| 179 | 4-phenyl with (n)-$H_{21}C_{10}CO_2$— | " | " | " |
| 180 | " | $CONH_2$ | " | " |
| 181 | " | CN | $C_{19}H_{19}$ $C_{10}H_{21}$ $C_{11}H_{23}$ } 1:1:1 | " |

We claim:
1. A process for dyeing and printing water-swellable cellulosic materials and blends thereof with synthetic materials in the presence of water and a solvent that is capable of maintaining cellulose in the swollen state, wherein the dye used is a compound of the general formula I:

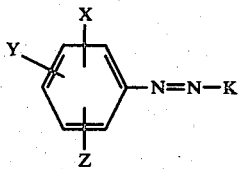

where K is the radical of a coupling component of the pyridone series,
one of the radicals X, Y and Z is a carboxylic acid ester group of a total of 2 to 19 carbon atoms; and,
the remaining substituents X, Y and Z are hydrogen, methyl, chlorine, bromine or nitro, with the proviso that the number of carbon atoms of the N-substituent in the pyridone moiety plus that of the carboxylic ester group is equal to or above 14.

2. A process as claimed in claim 1, wherein K in the dye used is a radical of the formula

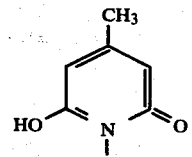

where; R is hydrogen, $C_1$–$C_{10}$-alkyl, allyl, $C_1$–$C_4$-alkyl which is substituted by $C_1$–$C_4$-alkoxy, by phenoxy, by phenoxyethoxy or by phenyl (which is itself unsubstituted or substituted), $C_6$–$C_{12}$-polyalkoxyalkyl, phenyl, cyclohexyl or norbornyl.

* * * * *